United States Patent [19]
Bertus et al.

[11] 3,862,255
[45] Jan. 21, 1975

[54] OXIDATIVE DEHYDROGENATION PROCESSES

[75] Inventors: Brent J. Bertus; Darrell W. Walker, both of Bartlesville, Okla.

[73] Assignee: Phillips Petroleum Company, Bartlesville, Okla.

[22] Filed: June 28, 1973

[21] Appl. No.: 374,648

Related U.S. Application Data

[62] Division of Ser. No. 140,973, May 6, 1971, Pat. No. 3,793,225.

[52] U.S. Cl. ............................ 260/680 E, 260/683.3
[51] Int. Cl. ................................................. C07c 5/18
[58] Field of Search ...................... 260/680 E, 683.3

[56] References Cited
UNITED STATES PATENTS

| | | | |
|---|---|---|---|
| 2,945,900 | 7/1960 | Alexander et al. | 260/680 E |
| 3,270,080 | 8/1966 | Christmann | 260/680 E |
| 3,642,930 | 2/1972 | Grasselli et al. | 260/680 E |
| 3,666,687 | 5/1972 | Croce et al. | 260/680 E |
| 3,670,042 | 6/1972 | Croce et al. | 260/680 E |
| 3,751,512 | 8/1973 | Woskow et al. | 260/680 E |

*Primary Examiner*—Paul M. Coughlan, Jr.

[57] ABSTRACT

Organic compounds are dehydrogenated to compounds having a higher degree of unsaturation by contacting the feedstock in the vapor phase at an elevated temperature in the presence of an oxygen-containing gas with a calcined catalyst containing a ferrous group metal, e.g., nickel, in combination with phosphorus, at least one Group IIa metal and oxygen. Representative of such conversions is the oxidative dehydrogenation of butane to 1,3-butadiene. The conversion products are valuable compounds particularly useful as intermediates for the preparation of polymeric materials such as synthetic rubbers and the like.

8 Claims, No Drawings

OXIDATIVE DEHYDROGENATION PROCESSES

This application is a divisional application of copending application Ser. No. 140,973, filed May 6, 1971, now U.S. Pat. No. 3,793,225.

The present invention relates to chemical compositions. More particularly, the invention relates to catalyst compositions, their preparation and to catalytic processes employing such compositions, e.g., processes for effecting the dehydrogenation of hydrocarbons.

Thermal catalytic and noncatalytic processes for converting organic compounds to compounds having a higher degree of unsaturation are known. The former are characterized by undesirable side reactions, low order of conversion and yields and poor product selectivity. The catalytic processes are generally characterized by the particular catalytic material employed and the conditions under which the processes are operated, e.g., in the absence or presence of oxygen. While a number of such catalytic processes have attained some measure of commercial success, there is a continuing search to develop catalytic materials for such processes. Preferred as catalysts for such processes are those materials which are more efficient in minimizing side reactions, in improving conversion rates, in improving yields and selectivites to desired end product, and which have a low susceptibility to deactivation, i.e., are capable of extended periods of operation without regeneration, and can be readily regenerated when necessary. The problem constantly faced by those skilled in the art is the discernment and characterization of the compositions which are highly efficient dehydrogenation catalysts.

A number of catalysts and catalyst systems which include halogens or halogen-releasing compounds have been disclosed. These exhibit many disadvantages in regard to equipment corrosion as well as the expense of continuously feeding, recovering and recycling the relatively expensive halogen materials. Halogen-free catalysts are the most desirable for use in dehydrogenation processes.

The present invention provides a novel catalyst and a novel process for the conversion of organic feedstocks to products having a greater degree of unsaturation and which have the same or lower number of carbon atoms as in the feed. According to this invention, an organic feedstock can be converted to products having a greater degree of unsaturation by contacting said feedstock under dehydrogenation conditions in the vapor phase in the presence of molecular oxygen with a calcined catalytic material comprising phosphorus in association with at least one of the metals nickel, cobalt or iron in combination with at least one Group IIa compound. The invention process is particularly applicable to the conversion of hydrocarbons. Thus, paraffinic hydrocarbons can be converted in good yields to diolefins and/or monoolefins, and monoolefins can be converted to diolefins. The invention is particularly applicable for the production of diolefins from paraffins and particularly useful results are obtained by the dehydrogenation of butane to 1,3-butadiene.

The hydrocarbon feedstocks which are applicable for the oxidative dehydrogenation processes of the present invention comprise dehydrogenatable aliphatic hydrocarbons having from 2 to about 12 carbon atoms per molecule and at least one

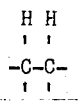

grouping, i.e., at least two adjacent carbon atoms having at least one hydrogen on each carbon. These can be branched or unbranched, cyclic or acyclic, and include paraffins and monoolefins, but paraffins are presently preferred. Particularly preferred as feed materials are dehydrogenatable aliphatic hydrocarbons having from about 4 to about 8 carbon atoms per molecule. The conversion of butane has been found particularly advantageous by the processes of the invention. Some specific examples of other feeds include ethane, propane, isobutane, pentane, cyclopentane, methylbutanes, hexane, 2-methylhexane, octane, 2,4-dimethyloctane, butene-2, 2-methylbutene-1, hexene-2, octene-1, 3-methylnonene-4, and the like, including mixtures of such compounds.

The novel catalysts of the present invention comprise phosphorus and at least one Group IIa metal in association with at least one metal selected from the group consisting of nickel, cobalt or iron. For convenience, the metal group consisting of nickel, cobalt or iron will be referred to as the ferrous group metals, or simply as the ferrous metals. These elements are not in the elemental state but are combined with sufficient oxygen to form one or more neutral compounds, for example, mixtures of nickel oxide, nickel phosphate, phosphorus oxide, magnesium phosphate, magnesium oxide, iron oxide, cobalt phosphate, and the like.

As noted, the catalysts of this invention comprise a catalytically active association of phosphorus, at least one ferrous metal component, and at least one Group IIa metal component, in combination with sufficient oxygen to satisfy the valence requirements of the several individual components. Thus, the amount of oxygen will be 100 percent less the combined percentage of the several individual components, i.e., the sum of phosphorus, ferrous metal and Group IIa components. In forming the catalysts of the invention, nickel is preferred for those embodiments containing a single ferrous metal component; in those embodiments containing a mixture of ferrous metal components, combinations of nickel-cobalt and nickel-iron are preferred.

Generally, the phosphorus component will be present in an amount such as to provide a phosphorus to ferrous metal atomic ratio in the range of 0.01–0.65:1, preferably 0.1–0.4:1. The Group IIa component will generally be present in an amount sufficient to provide an atomic ratio of Group IIa component to ferrous metal component of at least 0.1:1. Preferentially, the amount of Group IIa component is such as to provide an atomic ratio of Group IIa to ferrous metal in the range of 0.5–3:1, with an atomic ratio of 1–2:1 being particularly preferred. Of the Group IIa materials, magnesium is presently preferred although beryllium, calcium, strontium, and barium can also be used.

Optionally, the above catalyst components can be associated with a catalytic support material. Presently preferred support materials are selected from the group consisting of silica, alumina, boria, titania, zirconia or silica-alumina, although other conventional support materials can also be used. The support material, when used, will comprise from about 10 to about 95 weight percent of the total catalyst composite, including support material.

The above-described catalyst compositions can be, optionally, further associated with a catalyst-modifying quantity of other metals or metal oxides which are effective in improving activity, selectivity, or stability of the catalyst. For example, the catalyst can contain minor amounts of at least one Group Ia material. Additional adjuvants which can be used as modifiers for the catalysts of this invention are chromium, vanadium, molybdenum, ruthenium, rhodium, iridium, platinum, palladium and osmium. These adjuvants, when used, are generally present in minor amounts, for example, in the range of 0.05–10 weight percent, preferably 0.1–5 weight percent, based on the weight of the above-described catalyst compositions.

The catalysts of the present invention can be prepared by any suitable method. Conventional methods such as coprecipitation, impregnation, or dry mixing can be used. In general, any method can be used which will provide a composition containing the above-described elements in the above-described proportions and which will have a catalytic surface area of at least one square meter per gram.

Thus, a phosphorus compound, a ferrous metal compound and a Group IIa compound are combined in any suitable way. Substantially any phosphorus compound, ferrous metal compound and Group IIa metal compound can be employed in the catalyst composition so long as none of the compounds are deleterious to the final dehydrogenation catalyst and so long as essentially all of the elements in the compounds used, other than the phosphorus, ferrous metal, Group IIa compound and oxygen, and other than adjuvant elements which contribute to the effectiveness of the catalyst, are removed from the final catalyst by prior washing or by volatilization.

It has been found that, in some instances, minor amounts of still other elements can be tolerated in the catalyst. For example, when magnesium is incorporated into the catalyst by way of the magnesium sulfate compound, minor amounts of residual sulfur can be found in the finished catalyst, and the catalyst can still be effective. On the other hand, halogen residues are generally undesirable in such catalysts. Therefore, when halide compounds are used in the preparation of the catalyst, it is generally advisable to substantially remove the halogen residue such as by sufficient washing at an appropriate point in the preparation procedure.

Suitable phosphorus compounds include phosphoric acid, phosphorus oxides, ammonium phosphate, alkali metal phosphates, alkaline earth phosphates, and the like, including mixtures thereof.

Similarly, suitable ferrous metal compounds can be used. These can include both organic or inorganic compounds. Some examples of these are nickel oxide, nickel acetylacetonate, nickel nitrate, nickel acetate, nickel sulfate, nickel chloride, and the like, including mixtures thereof. Corresponding compounds of cobalt and iron can also be used.

Similarly, examples of catalyst-modifying materials comprising one or more alkali metal compounds can include lithium nitrate, sodium carbonate, potassium chloride, rubidium acetate, cesium nitrate, sodium phosphate, and the like, including mixtures therof.

Suitable Group IIa metal compounds which can be used in forming the catalyst of this invention include magnesium sulfate, magnesium carbonate, calcium carbonate, magnesium bromide, calcium chloride, strontium tartrate, barium hydroxide, and the like, including mixtures thereof.

A convenient method of preparation is to coprecipitate suitable catalyst-forming compounds from aqueous solutions followed by conventional aging, washing, drying, calcining, pelletizing, and the like. To these compositions, either in the wet gel, dry gel or even calcined states, can be mixed or added by impregnation other beneficial metals or even additional amounts of suitable phosphorus or ferrous metal compounds.

When a catalyst support is used, it can conveniently be introduced during the coprecipitation stage of the catalyst preparation. Alternatively, a solid catalyst support, generally in the finished form of a pellet, sphere, or particle, can be impregnated with solutions of the phosphorus compound, a suitable ferrous metal compound and a suitable Group IIa compound. The impregnated solid can then be dried and calcined. When other catalyst-modifying agents are used, they can be introduced into the catalyst either before, during or after the phosphorus, Group IIa and the ferrous metal compounds have been associated with the support.

Whichever catalyst preparation technique is used, the catalyst is activated prior to contact with the feed hydrocarbon by a calcination step. Thus, the finished catalyst is calcined in an oxygen-containing gas such as air at a temperature in the range of from about 900° to about 1500° F. for a time in the range of about 1 to about 24 hours, or until the catalyst is active for carrying out the oxidative dehydrogenation step.

The hydrocarbon feedstocks can be dehydrogenated according to the processes in the catalyst of the present invention at temperatures in the range of from about 800° to about 1300° F., preferably from about 950° to about 1100° F., at any convenient pressure such as from 7 to about 250 psia; and at a hydrocarbon:oxygen ratio from about 1:0.5 to about 1:4. The presence of steam is frequently beneficial and a steam:hydrocarbon ratio up to about 50:1 can be used. The hydrocarbon feed rate will generally be in the range of about 50 to about 1200 GHSV. The fixed catalyst bed is the preferred mode of contact, but other modes, such as a fluidized bed, can also be used.

The dehydrogenation processes of this invention are ordinarily carried out by forming a mixture, preferably preheated, of hydrocarbon feed, the oxygen-containing gas, and the steam (when used) and passing this mixture over the catalyst at the selected temperature. The effluent from the reaction zone is subjected to any suitable separation method to isolate and recover the desired products. Unconverted feeds or partially converted material can be recycled.

Generally, at least trace amounts of oxygenated products are also formed in these reactions. For example, compounds such as furan, acetaldehyde, furfural and acetic acid can be obtained. In some instances, butadiene can be formed as a by-product of the oxidative dehydrogenation of isopentane to isoprene.

The catalyst can operate for long periods without regeneration. However, if and when regeneration is required, this can be accomplished by simply halting the flow of feed hydrocarbons. Contact with the catalyst to the air and steam can be maintained at the elevated temperature until sufficient activity is restored.

The invention can be illustrated by the following exampmles.

EXAMPLE I

Preparation of Catalysts

Catalyst A: Sufficient quantities of nickel oxide, magnesium sulfate and phosphoric acid to produce a Ni/Mg/P/O composition having a Ni:Mg:P ratio of 1.0:0.24:0.13 were blended by dry mixing. The resulting mixture was slurried with water, dried at 300° F. for 3 hours and calcined at 1200° F. for about 16 hours. The calcined mixture was crushed and screened to a 20–30 mesh screen size.

Catalyst B: The procedure of Catalyst A was used to produce a Ni/Mg/P/O catalyst having a nickel:magnesium:phosphorus atomic ratio of 1:1:0.11.

Catalysts C, D, E and F: Separate portions of Catalyst B were contacted with solutions of a sufficient quantity of cobalt nitrate, ammonium vanadate, chromic acid and platinum chloride, respectively, to further promote the Ni/Mg/P/O catalyst by incorporating 5 percent by weight cobalt, 5 percent by weight vanadium, 1 percent by weight chromium, and 0.5 percent by weight platinum, respectively, based on the Ni/Mg/P/O catalyst. The impregnated catalysts were again calcined at 1000° F. for about 12 hours.

EXAMPLE II

Oxidative Dehydrogenation of Butane

The above-described catalysts were charged to a fixed bed reactor and used in several runs in which butane was dehydrogenated in the presence of air and steam. Run conditions with results of these several runs are reported in the following Table I. For purposes of comparison, a catalyst similar to the invention Ni/Mg/P/O catalyst, except that it contained no magnesium, was also tested for butane oxidative dehydrogenation. This comparison Ni/P/O catalyst is designated as Catalyst G in the table.

maintaining such conversion and modivity over a long period of time on-stream.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

We claim:

1. A process for the dehydrogenation of a dehydrogenatable aliphatic hydrocarbon feedstock having from 4 to 8 carbon atoms which comprises contacting said feedstock in the vapor phase under dehydrogenation conditions in the presence of molecular oxygen and in the absence of halogen with a catalyst consisting of nickel, at least one Group IIa metal, phosphorus and combined oxygen wherein the IIa:Ni atomic ratio is in the range of 0.5–3:1 and the P:Ni atomic ratio is in the range of 0.01–0.65:1 and optionally from 0.5 to 10 weight percent of an adjuvant selected from the group consisting of Group Ia metals, chromium, vanadium, molybdenum, ruthenium, rhodium, iridium, platinum, palladium and osmium.

2. The process of claim 1 wherein said Group IIa metal is magnesium.

3. The process of claim 1 wherein said catalyst contains from 0.05 to 10 weight percent of catalyst of an adjuvant selected from the group consisting of Group Ia metals, chromium, vanadium, molybdenum, ruthenium, rhodium, iridium, platinum, palladium, and osmium.

4. The process of claim 2 wherein said feedstock is butane.

5. A process for the dehydrogenation of a dehydrogenatable aliphatic hydrocarbon feedstock having from 4 to 8 carbon atoms which comprises contacting

TABLE I
Oxidative Dehydrogenation of Butane

| Run | Catalyst | Atomic Ratio Ni:Mg:P | Adjuvant, (wt. %) | Steam:Hydrocarbon Ratio | $C_4$ GHSV | Air GHSV | Temp., °F. | Time, Hrs. | Conv., % | Modivity(a), % | Yields – % Butadiene | Butene | Butenes & Butadiene |
|---|---|---|---|---|---|---|---|---|---|---|---|---|---|
| 1 | A | 1:0.24:0.13 | | 10:1 | 50 | 250 | 900 | 1 | 25.7 | 53.8 | 6.0 | 7.9 | 13.9 |
| 2 | A | 1:0.24:0.13 | | 10:1 | 50 | 250 | 1050 | 1 | 36.7 | 41.9 | 12.4 | 3.0 | 15.4 |
| 3 | A | 1:0.24:0.13 | | 10:1 | 50 | 250 | 1100 | 1 | 41.0 | 39.4 | 14.0 | 4.2 | 18.2 |
| 4 | B | 1:1:0.11 | | 10:1 | 500 | 2650 | 1100 | 2 | 37.0 | 66.4 | | | 24.6 |
| | | | | | | | | 4 | 38.1 | 67.0 | | | 25.5 |
| | | | | | | | | 6 | 37.9 | 67.3 | | | 25.5 |
| | | | | | | | | 8 | 37.9 | 66.7 | | | 25.3 |
| | | | | | | | | 10 | 37.9 | 66.5 | | | 25.2 |
| 5 | C | 1:1:0.11 | Co (5 %) | 10:1 | 500 | 2650 | 1000 | 12 | 36.4 | 66.5 | 11.9 | 12.5 | 24.2 |
| 6 | D | 1:1:0.11 | V (5 %) | 10:1 | 500 | 2650 | 1000 | 12 | 32.2 | 64.0 | 9.3 | 11.3 | 20.6 |
| 7 | E | 1:1:0.11 | Cr (1 %) | 10:1 | 500 | 2650 | 1000 | 12 | 33.0 | 65.8 | 10.1 | 11.6 | 21.7 |
| 8 | F | 1:1:0.11 | Pt (0.5 %) | 10:1 | 500 | 2650 | 1000 | 12 | 16.3 | 34.6 | 4.3 | 8.3 | 12.6 |
| 9 | G | 1:0:0.13 | | 10:1 | 300 | 1500 | 1100 | 12 | 26.8 | 72.8 | 8.0 | 11.5 | 19.5 |
| | | | | | | | | 13.5 | 29.9 | 52.2 | 9.6 | 6.0 | 15.6 |

(a) To butadienes and butenes. Modivity is a modified selectivity based on analysis of gas phase product for converted hydrocarbons, carbon oxides and unconverted feed.

As used herein, conversion/yield are reported on same basis as modivity.

The data in the foregoing table show that catalysts prepared according to this invention, i.e., catalysts containing ferrous metal-phosphorus-Group IIa-oxygen components and, optionally, activity modifiers such as vanadium, chromium and platinum show substantial activity for the oxidative dehydrogenation of butane to form olefins and diolefins. Comparing the similar but magnesium-free Catalyst G with the invention catalysts, particularly Catalyst B, shows that the presence of a substantial amount of magnesium is greatly beneficial in providing high conversion and/or modivity and said feedstock in the vapor phase under dehydrogenation conditions in the presence of molecular oxygen and in the absence of halogen with a catalyst consisting of cobalt, at least one Group IIa metal, phosphorus and combined oxygen wherein the IIa:Co atomic ratio is in the range of 0.5–3:1 and the P:Co atomic ratio is in the range of 0.01–0.65:1 and optionally from 0.05 to 10 weight percent of an adjuvant selected from the group consisting of Group Ia metals, chromium, vanadium, molybdenum, ruthenium, rhodium, iridium, platinum, palladium and osmium.

6. The process of claim 5 wherein said Group IIa metal is magnesium.

7. The process of claim 5 wherein said catalyst contains from 0.05 to 10 weight percent of catalyst of an adjuvant selected from the group consisting of Group Ia metals, chromium, vanadium, molybdenum, ruthenium, rhodium, iridium, platinum, palladium, and osmium.

8. The process of claim 6 wherein said feedstock is butane.

* * * * *

UNITED STATES PATENT OFFICE
CERTIFICATE OF CORRECTION

PATENT NO. : 3,862,255
DATED : January 21, 1975
INVENTOR(S) : Brent J. Bertus et al It is certified that error appears in the above-identified patent and that said Letters Patent are hereby corrected as shown below:

Claim 1, column 6, line 20, 0.5 should be --- 0.05 ---.

Signed and sealed this 20th day of May 1975.

(SEAL)
Attest:

RUTH C. MASON
Attesting Officer

C. MARSHALL DANN
Commissioner of Patents
and Trademarks